March 20, 1951     R. M. LICHTENSTEIN ET AL     2,546,035

HIGH-VOLTAGE SUPPLY

Filed Aug. 23, 1949

Inventors:
Roland M. Lichtenstein,
Edmund E. Goodale
Warner W. Schultz,
by Paul A. Frank
Their Attorney.

Patented Mar. 20, 1951

2,546,035

UNITED STATES PATENT OFFICE 2,546,035

HIGH-VOLTAGE SUPPLY

Roland M. Lichtenstein and Warner W. Schultz, Schenectady, and Edmund E. Goodale, Scotia, N. Y., assignors to General Electric Company, a corporation of New York Application August 23, 1949, Serial No. 111,928

4 Claims. (Cl. 171—97)

Our invention relates to direct current voltage supplies and has particular reference to high voltage supplies having very good regulation.

Well-regulated high voltage direct current supplies have many applications but are in general rather large and expensive to construct. Where unidirectional potentials in the range from a kilovolt to several million volts are required, even very small loads cause substantial voltage drops in the usual type of power supply, and good voltage regulation for high potentials is difficult to obtain. While high unidirectional voltages have been simply and economically obtained by charging capacitors in parallel and discharging them in series, such apparatus has not been capable of use where good regulation is required, this type of arrangement being generally employed for providing surge voltages.

It is an object of our invention to provide an improved high voltage direct current source having very good regulation.

It is a further object of our invention to provide a simple and compact high voltage direct current power supply from a relatively low voltage source.

According to our invention, we employ a plurality of series-connected capacitors which are individually charged from a relatively low voltage source to provide a cumulative voltage across the terminals of the series-connected bank which is equivalent at no load to the product of the number of charged capacitors times the value of the charging voltage. A cyclical switching arrangement is employed to charge the capacitors sequentially and to repeat the charging process periodically at a sufficient rate to provide good regulation for the desired load current through the capacitor bank.

Figure 3:
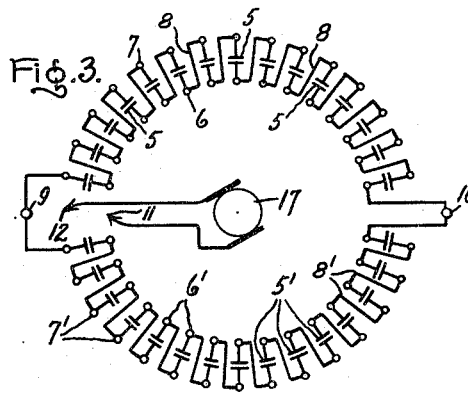
Figure 4:
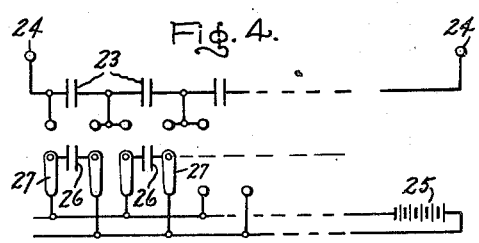
Figure 5:
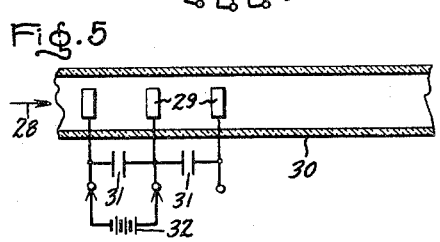

The features which we desire to protect herein are pointed out with particularity in the appended claims. The invention itself, together with further objects and advantages thereof, may best be understood by reference to the following description taken in connection with the drawings in which Fig. 1 is an elevation of a power supply embodying our invention, Fig. 2 is a side view of the embodiment shown in Fig. 1, Fig. 3 is a circuit diagram of the embodiment shown in Figs. 1 and 2, Fig. 4 is a circuit diagram of a modification of our invention and Fig. 5 is a partial view of a charged-particle accelerator employing our invention.

Figure 1:
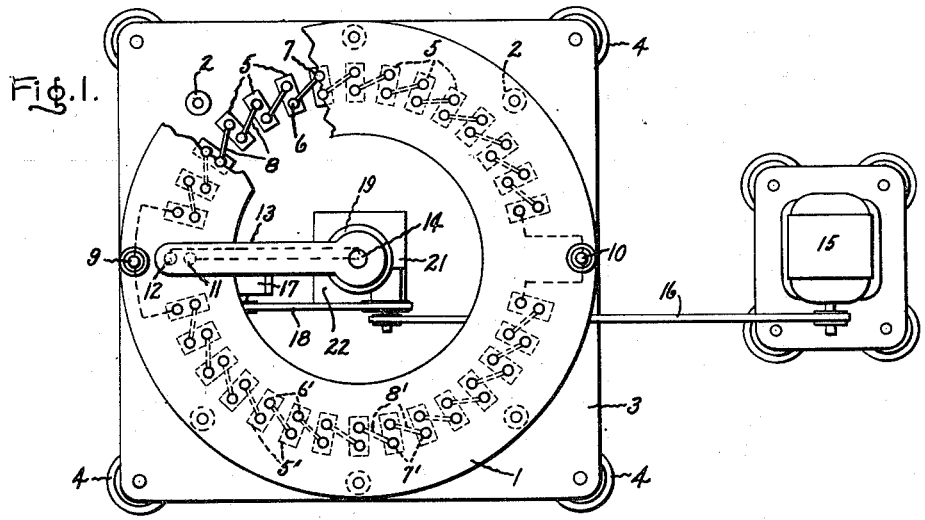
Figure 2:
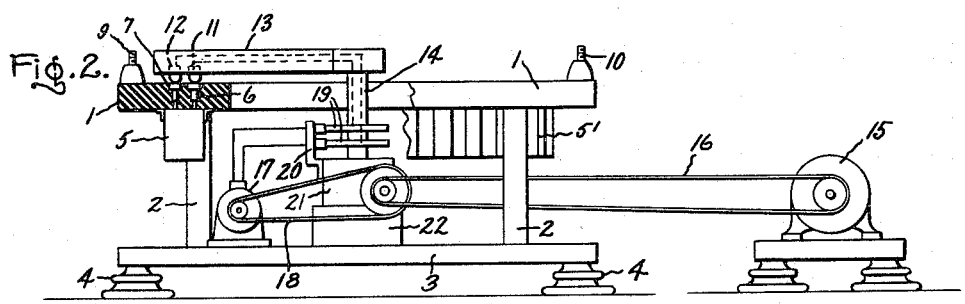

Referring now to the drawings a direct current voltage source embodying our invention is represented by Figs. 1 and 2. In this embodiment an annular disk 1 of mechanically strong insulating material, is supported by a plurality of insulating rods 2 from a rectangular base 3 made of a suitable insulating material. Additional insulating supports 4, such as ceramic stand-off insulators, may be positioned under the insulating base 3 when further insulation is required for very high voltages to prevent electric leakage to ground. A plurality of capacitors 5, which may suitably be of an oil-filled type, are arranged in a semi-circle on the lower surfaces of the annular disk 1 and their terminals are connected to a double row of contacts fastened on the upper surface of the disk 1, one terminal of each capacitor being connected to a corresponding contact in an inner contact row 6 and the other terminal of each capacitor being connected to a corresponding terminal in an outer row 7. Conductive links 8 are employed to connect the capacitors 5 in series, preferably on the underside of the disk 1. To provide a cumulative series voltage, the terminal of each capacitor connected to the inner contact row 6 is linked to the terminal of the next capacitor in the series which is connected to the outer contact row 7. A pair of high voltage output terminals 9 and 10 are suitably mounted on the annular disk 1 adjacent to the respective end capacitors in the semi-circular series bank and each is connected to the respective end capacitor terminal. Since the high voltage terminals are well-insulated from each other due to the spacing required to accommodate the series-connected capacitors between them, voltage breakdown is avoided when the capacitors 5 are each charged from a relatively low voltage supply to provide a cumulative voltage appearing across the terminals at the ends of the series-connected capacitor bank, as will be described in a following paragraph. Each of the capacitors is, of course, sufficiently insulated from the adjacent capacitors for the incremental voltage of the supply source.

For economy of space a second bank of series-connected capacitors 5' is connected in parallel with the first bank of capacitors 5 and positioned in a semi-circular arrangement on the other half of the annular disk 1. The terminals are similarly connected to an inner and outer row of contacts 6' and 7' respectively, these contact rows having the same diameters and center as their counterparts 5 and 6. The capacitors 5' are likewise connected in series by conductive connecting links 8' and a terminal of each end capacitor is connected to the high voltage terminals 9 and 10. It is to be understood, of course, that but one bank of series-connected capacitors may be employed or that different combinations of series and parallel connected capacitors may be employed, depending upon the ratings and physical size of capacitors available.

In order to charge the capacitors 5 and 5' individually a pair of resilient contact fingers 11 and 12, which may suitably be made of beryllium copper, are mounted on a rotatable commutating arm 13 which is connected at one end to a commutator shaft 14 extending through the center of the annular disk 1 in order that the fingers may make contact with the contact rows 6 and 7 as the arm is rotated. A motor 15 is employed to drive the shaft 14, the motor being provided with an insulating drive belt 16 or other suitable means for insulating it from the commutator shaft 14. To provide a source of capacitor charging voltage, a generator 17 is driven from the commutator shaft 14 by a belt 18, although other unidirectional voltage sources such as batteries may likewise be employed, if desired. A pair of slip rings 19 on the commutator shaft 14 are connected to the output of the generator 17 through a brush assembly 20, the slip rings being conductively connected to the contact fingers 11 and 12 at the end of the commutating arm. By properly selecting the desired pulley and gear ratios for the motor, generator, and commutating shaft system, the single drive motor 15 has been found satisfactory both for rotating the contact arm and generating the desired charging voltage. We have also found it desirable to employ a speed reducing gear box 21 which is supported from the base 3 of the power supply assembly by insulating members 22. The commutating shaft 14 may be conveniently supported from the gear box 21.

Referring now to Fig. 3, it may be seen that the capacitors 5 and 5' are so arranged that they may be cumulatively charged by the low voltage source 17 through the contact fingers 11 and 12 on the commutating arm. Thus, as the contact fingers travel over the inner and outer rows 6 and 7 (and 6' and 7') of capacitor terminal contacts, the voltage of the source 17 is shunted across each capacitor individually until the whole series is sequentially charged, the process then being repeated as the commutating arm 13 is rotated by the motor 15. Inasmuch as the voltage increment at each capacitor is relatively small, the adjacent capacitors may be spaced fairly close together, the greater insulation required for widely separated capacitors in the series bank due to the large potential between them being provided by the physical spacing of the capacitors. One of the high voltage terminals 9 or 10 may be grounded, if desired, depending upon the nature of the ground connections in the load to be imposed on the power supply, but one terminal at least should be fully insulated for the high output voltage from ground, including insulation from the electrical circuit of the driving motor. Precautions should be taken to prevent leakage which might load the power supply and cause an undesired voltage drop, adequate spacing from ground being the usual safeguard. Since the voltage source 17 electrically travels between the negative and positive high voltage terminals, it must be insulated for the total voltage output of the power system, thus requiring the insulating base 3 and other members 22 used to support the generator 17 to be adequate insulation for that voltage rather than merely for the generator voltage itself.

At no load the output voltage across the high potential terminals is expressed as $$V_0 = nE \qquad (1)$$

where $V_0$ is the load output voltage, $n$ is the number of capacitors in series, and $E$ is the charging voltage. With any given load current $i$ the voltage across each charging capacitor drops to a value $E'$ before the capacitor is recharged to the value $E$. Hence, the average voltage output of the power supply is expressed as $$V_{ave} = n\frac{(E+E')}{2} \qquad (2)$$

The regulation of the power supply for the given load current $i$ may be derived by equating the charge $q$ delivered to each capacitor by the voltage source to the output discharge as follows:

$$q = \frac{i}{f} = C(E - E') \qquad (3)$$

where $f$ is the capacitor charging rate in inverse seconds. While this equation is based on the assumption that a charging voltage is impressed long enough to impart the maximum charge to the capacitor, the assumption is justified over a wide range of operation, inasmuch as the low impedance of each charging circuit permits full charging in a few microseconds. Solving Equation 3

$$E' = E - \frac{i}{fC} \qquad (4)$$

and $$V_{ave} = n\left(E - \frac{i}{2fC}\right) \qquad (5)$$

The voltage ripple, on the other hand, is substantially less than the voltage drop from no load, being equal to the peak-to-peak ripple of each capacitor and is expressed as $$\text{Ripple} = \frac{i}{fC} \qquad (6)$$

The quality of the regulation achieved may be appreciated by assigning values to the equation components. Thus, as an example let $n = 100$
$E = 100$ volts
$i = 5$ microamperes
$C = 2$ microfarads
$f = 5$ cycles per second Substituting these values in Equations 1 and 5, it may be seen that $$V_0 = 10,000 \text{ volts}$$

and $$V_{ave} = 9,975 \text{ volts}$$

Thus, it may be seen that the voltage drop is 25 volts, a drop of only ¼%. The peak-to-peak ripple is $$\frac{i}{fC} = \tfrac{1}{2} \text{ volt}$$

For obtaining higher voltages in the range of hundreds of kilovolts and higher, an arrangement as shown in Fig. 4 is preferred. As in the embodiment previously desired, a plurality of capacitors 23 are connected in series with a high voltage terminal 24 at each end of the series to provide a high direct voltage source. A low-voltage charging source 25, represented conventionally as a battery, is employed to charge the series capacitors 23 through a plurality of intermediate capacitors 26 which we refer to hereinafter as transport capacitors. As shown in the figure, the transport capacitors 26 are connected through a switching arrangement 27 having pivoted switch arms so that the capacitors are charged in parallel by the voltage source 25. The switch arrangement is then actuated so that each transport capacitor 26 is connected in parallel with a corresponding series capacitor 23 of the power supply. In this manner a cumulative high voltage is built up between the terminals 24 of the charging capacitor series such as previously described. While the transport capacitors represent an additional outlay of equipment, they are desirable in that the charging voltage source 25 need not be insulated for high voltage since it is not connected directly to the charging capacitors 23 at any time. The switching arrangement 27 may be made to operate simultaneously or sequentially as desired, but we have found it preferable for the sake of simplicity to charge the transport capacitors simultaneously and to discharge them in the same manner.

The no load voltage of a power supply constructed according to Fig. 4 is also equivalent to the number of charged capacitors in series times the voltage of the charging source. It can be shown that the average voltage for a given current is $$V_{ave} = n\left[E - \frac{i}{2f}\left(\frac{C_t + 2C}{C_t \times C}\right)\right] \qquad (7)$$

where $C_t$ represents the capacitance in farads of the transport capacitors and other symbols remain as previously identified. When $C_t$ is the same as C, the equation is simplified and the average voltage may be expressed as $$V_{ave} = n\left(E - \frac{3}{2}\frac{i}{fC}\right) \qquad (8)$$

and the ripple voltage is $$\text{Ripple} = \frac{i}{fC} \qquad (9)$$

It is obvious that without departing from the spirit of our invention the system may be compounded or pyramided if desired so that output from one capacitor series is employed to charge a series charging capacitor or the transport capacitor of a higher voltage capacitor series.

While we have referred to the use of our high voltage system with loads attached to the high voltage terminals the voltage appearing across each capacitor in the output series may be employed in applications where a series of stepped voltages are useful. Thus, for such applications as accelerating electrically charged particles, as shown in Fig. 5, a voltage gradient along a path is desired. The path for the electrically charged particles which may be ions, electrons, protons, or similar particles is indicated by the arrow at 28. A plurality of control electrodes 29 are sealed in the walls of the dielectric tube 30 enclosing the path of the particles. The control electrodes 29 may suitably comprise rings of metal co-axial with the particle path. In operating this embodiment of our invention a series charging capacitor 31 is provided between the external terminals of each adjacent pair of control electrodes 29. Each capacitor is sequentially and periodically charged from a unidirectional voltage source 32 to provide a cumulative potential along the capacitor bank as previously described, the spacing of the electrodes as required for the operation of the accelerator providing the electrical insulating spacing required. With such a type of structure the incremental voltage of the power supply existing between each pair of control electrodes is usefully and economically employed with a minimum of space required for the voltage supply itself. In addition, since the voltage is built up from increments rather than divided from a large voltage as is the usual case in such accelerating systems, no dropping resistors or other load-imposing network between the control electrodes is required.

While the present invention has been described by reference to particular embodiments thereof, it will be understood that numerous modifications may be made by those skilled in the art without actually departing from the invention. We, therefore, aim in the appended claims to cover all such equivalent variations as come within the true spirit and scope of the foregoing disclosure.

What we claim as new and desire to secure by Letters Patent of the United States is:

1. The method providing a high voltage between a pair of terminals having a plurality of charging capacitors connected in series therebetween which comprises connecting a corresponding second plurality of capacitors in parallel, charging said second named capacitors from a voltage source, connecting each of said charged capacitors in parallel with a corresponding capacitor of said first named capacitors to provide a cumulative voltage across said terminals equal at no load to the product of the voltage of said source times the number of said first named capacitors in series, and periodically repeating said charging processes.

2. A direct current voltage supply comprising a first plurality of capacitors permanently connected in electrically series arrangement, a second plurality of capacitors adapted to be charged in electrically parallel arrangement from a low voltage source, and switching means for connecting each of said capacitors of said second plurality of capacitors to a corresponding capacitor of said first plurality of capacitors to provide a cumulative voltage between the extremeties of the series arrangement of said first plurality of capacitors equal at no load to the product of the voltage of said low voltage source times the number of said capacitors in said first plurality of capacitors in series.

3. Apparatus as in claim 2 wherein said switching means comprises simultaneously operable switches.

4. Apparatus as in claim 2 wherein said switching means comprises sequentially operable switches.

ROLAND M. LICHTENSTEIN.
WARNER W. SCHULTZ.
EDMUND E. GOODALE.

REFERENCES CITED

The following references are of record in the file of this patent:

UNITED STATES PATENTS

| Number | Name | Date |
|---|---|---|
| 1,508,162 | Chubb | Sept. 9, 1924 |
| 1,553,364 | Chubb | Sept. 15, 1925 |
| 2,038,553 | Dubilier | Apr. 28, 1936 |
| 2,430,265 | Weisglass | Nov. 4, 1947 |